United States Patent

Ban

[15] 3,672,683

[45] June 27, 1972

[54] TAPE PLAYER FOR PLAYING PLURALITY OF MAGNETIC TAPE CARTRIDGES

[72] Inventor: Itsuki Ban, 829, Higashi-Oizumimachi, Nerima-ku, Tokyo-to, Japan

[22] Filed: March 20, 1970

[21] Appl. No.: 21,355

[52] U.S. Cl. ..........................274/4 F, 179/100.2 Z, 274/4 B

[51] Int. Cl. ..........................G11b 23/10

[58] Field of Search..........................274/4 B, 4 F, 11 C, 11 E; 179/100.2 Z, 100.2 MD; 242/180, 181; 353/15; 352/8, 123

[56] References Cited

UNITED STATES PATENTS

| | | | |
|---|---|---|---|
| 2,941,739 | 6/1960 | Burke | 242/181 |
| 2,944,116 | 7/1960 | Vershoven | 179/100.2 MI |
| 3,109,898 | 11/1963 | Gray | 179/100.2 Z |
| 3,472,579 | 10/1969 | Schwartz | 274/4 F |

*Primary Examiner*—William D. Martin, Jr.
*Assistant Examiner*—Dennis A. Dearing
*Attorney*—Jacobs & Jacobs

[57] ABSTRACT

A tape player for playing a plurality of magnetic tape cartridges comprises a compartment adapted to vertically and horizontally receive a plurality of the magnetic tape cartridges, a deck provided with a reproduction means including a tape driving device for drivingly feeding the tape in the cartridge and at least one magnetic head adapted to transduce the tape, a horizontally movable mechanism for horizontally moving the deck, a laterally movable mechanism for laterally moving the deck, a lock for selectively locking the deck in the position where one cartridge is to be played, a shifting mechanism for moving the cartridge opposite to the deck retained by the lock means from the compartment toward the deck and for returnedly moving the cartridge from the playing position to the original position in the compartment, and an index mechanism for designating the cartridge to be played.

8 Claims, 6 Drawing Figures

TAPE PLAYER FOR PLAYING PLURALITY OF MAGNETIC TAPE CARTRIDGES

BACKGROUND OF THE INVENTION

The present invention relates to a tape player for playing a plurality of magnetic tape cartridges and more particularly to a tape player which vertically and horizontally receive a plurality of cartridges in a compartment to play an optional one of the cartridges.

One type of a multiple cartridge player as well known is adapted to receive the cartridges arranged horizontally or vertically. According to such the player, a cabinet must be increased in its dimension when the number of the cartridges is increased and the number of the cartridges to be used is thus limited. Further, the conventional tape player of this class should be provided with a lengthy capstan common to each cartridge to drivingly transport the tape. Manufacture of elaborate and long capstans requires rare technical skill, and if the capstans fail in their reliability the running speed of the tape is not stable to cause wow-flutter.

The inventor has succeeded in obtaining a tape player which is capable of disposing cartridges vertically and horizontally and accommodating the cartridges as many as possible in spaces as small as possible. According to this tape player, a capstan to be used is made of short dimension.

SUMMARY OF THE INVENTION

It is a primary object of the invention to provide a tape player which is capable of accommodating a plurality of tape cartridges vertically and horizontally and of selecting one out of them to be played.

Another object of the invention is to provide a tape player in which there is provided a deck including a tape driving means for drivingly transporting a tape within the cartridge and a reproducing means having at least one magnetic head adapted to transduce the tape, said deck being automatically moved to the position where one selected cartridge is to be played, said selected cartridge being moved from its original position where it is received toward the playing position on the deck where it is played by the reproducing means.

A further object of the invention is to provide a tape player wherein the cartridge held in the play position is automatically returned to its original position when next cartridge is indexed for its play as one cartridge is played and the next indexed cartridge being automatically moved to the playing position so that selected cartridges are successively played.

Still another object of the invention is to provide a tape player comprising a means for moving the tape cartridge between the original and playing positions, and a holding means for holding the cartridge, said means being engaged with the leading edge of the cartridge.

In accordance with the invention, the cartridge is adapted so that the leading edge thereof is held by the holding means and moved from the original position to the playing position whereby a plurality of the cartridges may be arranged vertically and horizontally as considered to be difficult to do so technically by means of lever mechanism for clamping the cartridge at front and rear ends thereof.

Yet another object of the invention is to provide a tape player of simple in its construction and made of relatively low cost, wherein movement of the deck and the cartridge is effected by use of drive force of the tape driving means.

Further objects and additional advantages of the invention will become apparent from the following detailed description and annexed drawings, wherein

DESCRIPTION OF THE PREFERRED EMBODIMENTS

Figure 1:
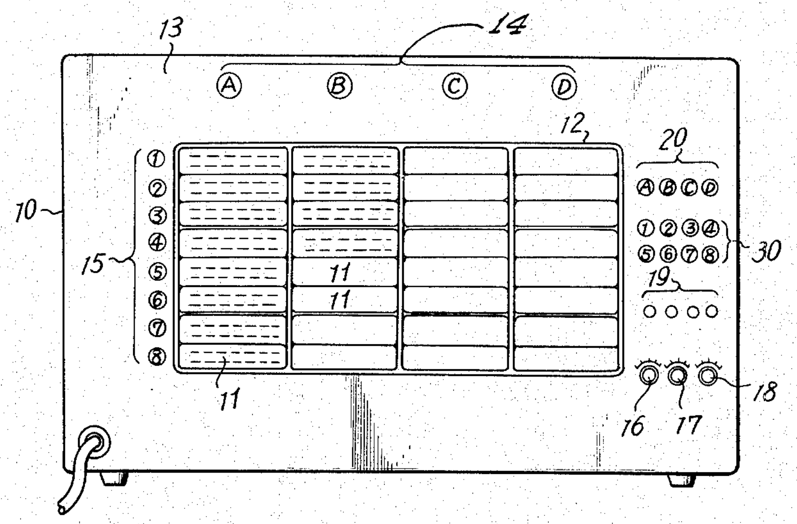
FIG. 1 is a front view in elevation of a magnetic tape player cabinet employing this invention.
Figure 2:
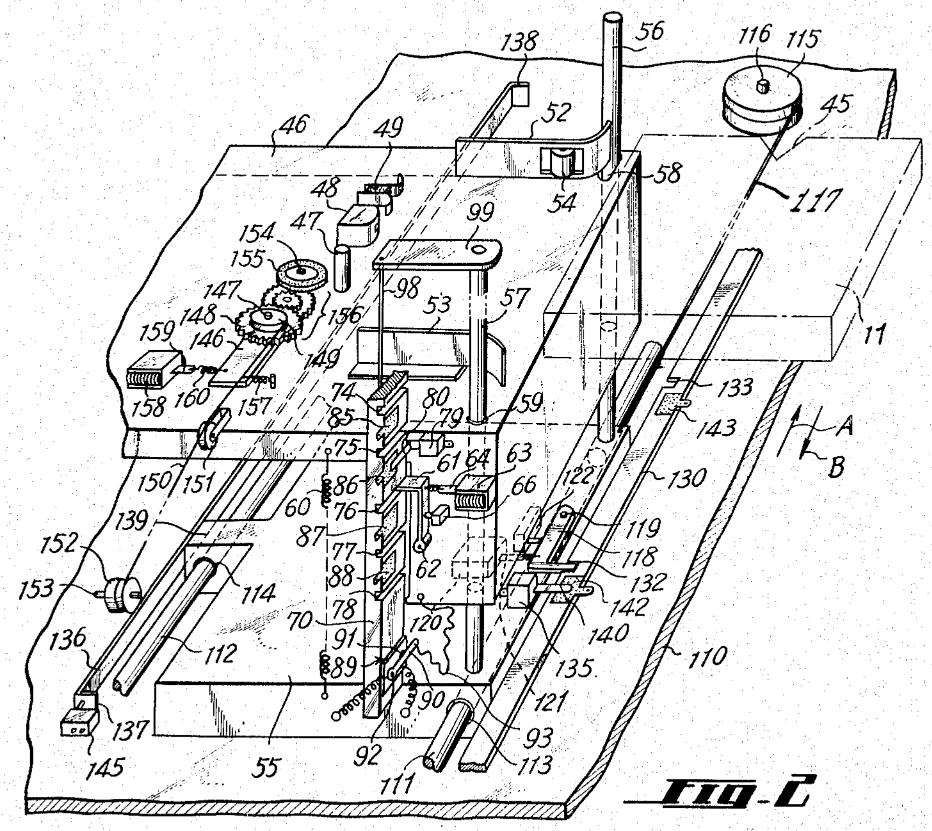
FIG. 2 is a perspective view of the operative mechanism in the tape player in FIG. 1.

Referring to FIG. 1 of the drawings, a magnetic tape playing cabinet is shown as indicated at 10 and having cartridge compartments 12 forming cavities which vertically and horizontally receive a plurality of magnetic tape cartridges in stack therein. The cartridge compartment 12 is shown as such that are adapted to form cavities defined thereby to receive eight cartridges in vertical position and four cartridges in horizontal position. The cartridges 11 to be in the cabinet 10 are each received in the respective cavities in a manner that the rear end of the cartridge is slightly projected from a front panel 13 of the cabinet 10. The front panel 13 is provided with index legends, for instance, numerals and characters to designate the rows and the lines of the cartridges. The numerals and characters are shown as indicium 15, 14, the former being 1 to 8 and the latter being A, B, C, and D. Control knob sets 16, 17, and 18 are also provided on the panel 13 to adjust volume, stereo balance, and tone. Push buttons 20 which are affixed by characters A, B, C, and D are provided on the panel 13 to correspond to cartridge selecting switches 21, 22, 23, and 24 (FIG. 4) as will be described later. Push buttons 30 which are affixed by numerals 1 to 8 are also provided on the panel 13 to correspond to cartridge selecting switches 31 to 38 (FIG. 4) as will be described later. Push buttons 19 are provided on the panel 13 to correspond to track selecting switches (now shown). A mechanism is provided in the cabinet 10 so that the push buttons 20 and 30 for the cartridge selecting switches are depressed to automatically play one cartridge 11 as designated. A portion of the mechanism is shown in FIG. 2, in which one cartridge 11 is shown in the dotted line as indexed by the character B of the indicium 14 and the numeral 6 of the indicium 15. The cartridge 11 is constructed in a well known manner and includes a generally rectangular container which contains a spirally rolled endless magnetic tape 40 (FIG. 1). As seen from a portion of the cartridge 11 in FIG. 6, pinch roller 41 is disposed adjacent the leading edge of the cartridge and a plurality of openings 42, 43 and 44 are formed on the leading edge thereof. A notch 45 is provided on the cartridge 11 at one side thereof.

The playing mechanism is referred to hereinbefore comprises a movable deck 46 in which are provided a capstan 47 for driving the tape 40 within the cartridge 11, a magnetic head 48 adapted to transduce the tape 40, and an endmark detector 49 having a pair of mutually insulated feeler contacts. Mounted to the deck 46 at underneath thereof is a motor (not shown) which drives through a belt (not shown) a flywheel 50 (FIG. 3) attached to the lower end of the capstan 47 to rotatably drive the latter. The capstan 47 is rotatably supported by a suitable bearing 51 (FIG. 3) mounted to the deck 46 at underneath thereof and extends upwardly of the deck through a hole (not shown) formed on the deck 46. Mounted to the deck 46 are a pair of laterally spaced parallel cartridge guides 52 and 53 which are secured to the deck and provide away for the tape cartridge 11. The cartridge guides 52 and 53 are made of resilient material and outwardly bent at each end thereof to facilitate insertion of the cartridge between the guides. The cartridge guide 53 is provided with a retention roller 54 to engage the notch 45 of the cartridge 11 when the cartridge is inserted between the guides 52 and 53. The roller 54 forces the inclined wall of the notch 45 in the cartridge 11 to exert the forward force to the cartridge so that the pinch roller 41 in the cartridge 11 is pressed over the tape 41 against the capstan 41 to serve to position the cartridge 11 in the playing position where the tape 40 is drivingly transported across the magnetic head 48.

Figure 3:
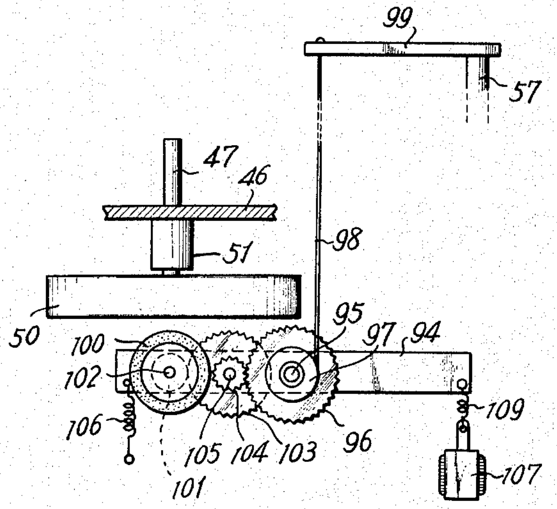
FIG. 3 is a partial side view of the shifting means for the deck in FIG. 2.
Figure 4:
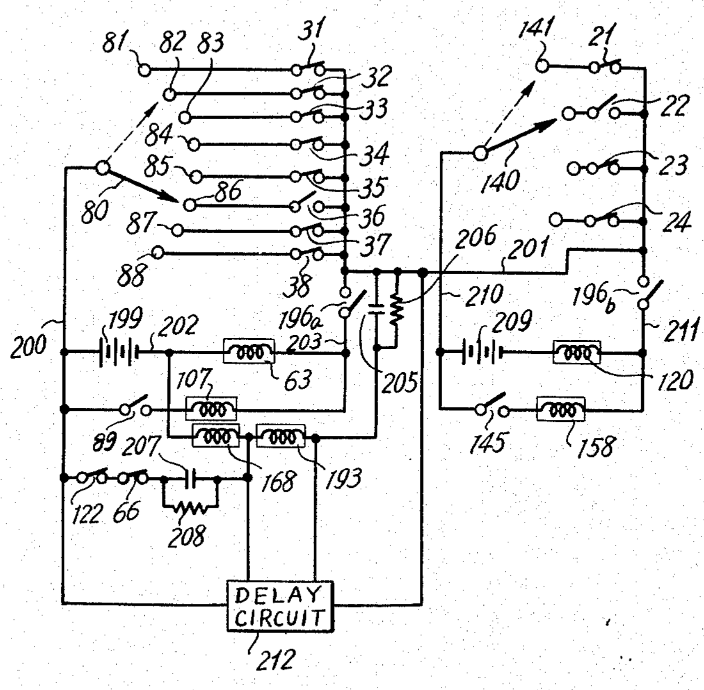
FIG. 4 is a schematic circuit diagram of the player.

The deck 46 is installed upon a supporting surface such as a carriage 55. The position of the deck 46 relative to the carriage 55 is maintained by a pair of elongate guide rods 56 and 57, which are attached to the carriage in a rigid and secure manner by conventional means such as threading or the like. The guide rods 56 and 57 pass through suitable elongate guideway openings 58 and 59, respectively, formed through the upturned legs of the deck 46. The openings 58 and 59 are formed so as to provide a slip fitted with the guide rods 56 and 57. This permits the deck 46 to be slid upward upon the guide rods and moved away from the carriage 55 in a vertical direction. The deck 46 is normally urged downwardly by a tension spring 60 one end of which is secured to the deck 46 and the other end is attached to the carriage 55. Movement of the deck 46 by the spring 60 is arrested by a lock means as will be described later. The lock means comprises a substantially L-shaped lever 61 swingably provided by a pin 62 on the deck 46 at one side thereof. The lever 61 is connected by a spring 65 to a plunger 64 of a solenoid 63 mounted to the deck at one side thereof. An electrical switch 66 is mounted to the deck 46 at one side thereof. The electrical switch 66 is actuated by the lever 61 which is clockwise swung by the plunger 64 of the solenoid 63 when the solenoid 63 is energized. The details of a control circuit including the solenoid 63 and the switch 66 will be described later. The lever 61 cooperate with slots 71 to 78 (71, 72, and 73 being omitted away from FIG. 4) provided in a bar 70 which is secured to the carriage 55. The bar 70 of a rectangle in section and in a elongated shape is made of an insulator and vertically extends from the carriage 55 while passing adjacent the deck 46 at side edge thereof. The location of the slots 71 to 78 correspond to that of the cartridge so that the lever 61 may engage one of the slots to lock the deck 49 in position with respect the cartridges in a row standing at the same level in each column. The lever 61 is biased against the bar 70 by a spring so as to engage one of the slots in the bar 70 when the solenoid 63 is deenergized. The bar 70 is provided with eight contacts 81 to 88 (81, 82, 83, and 84 are shown in FIG. 4) to correspond to the slots 71 to 78. A block 79 of an insulator having a common contact 80 for the contacts 81 to 88 is firmly mounted to the deck 46 at one side thereof. The common contact 80 is caused to be selectively in contact with each of the contacts 81 to 88 when the deck 46 moves up and down along the guide rods 56 and 57 in a manner as will be described later. Operation of an electrical switch including the common contact 80 and the contacts 81 to 88 will be described later. Provided on the bar 70 is a switch 89 which has a movable contact 90 and a fixed contact 91. The movable contact 90 has one end pivotally mounted at a point 92 and the free end extending to lower region of the deck 46. When the deck 46 is moved down to the lowermost position, the free end of the movable contact 90 is depressed by the lower end of the deck 46 to allow the movable contact 90 to come in contact with the fixed contact 91. A string 93 such as nylon thread is connected to the movable contact 90 of the switch 89 and the deck 46 and is tensioned when the deck 46 is moved up to the uppermost position to allow the movable contact 90 to move away from the fixed contact 91 to disconnect therewith. In other words, the switch 89 is designed to be in opened condition while the deck 46 is moving down and to be in closed condition while the deck is moving up. The details of a shifting mechanism for moving up the deck 46 are shown in FIG. 3. The shifting mechanism includes a swing lever 94. The swing lever 94 is pivoted on an axis 95 connected to a suitable bracket (not shown) which depends from the under side of the deck 46. A gear 96 and a drum 97 which are coupled by suitable means or integrally formed are journaled to the axis 95. A string 98 is wound to the drum 97 and drawn through a hole (not shown) bored through the deck 46 to extend above the deck 46. The leading end of the string is fixed to a plate 99 mounted to the guide rod 57 at one end thereof. A rubber covered frictional wheel 100 and a gear 101 connected to each other are journaled to a pivot 102 connected to the swing lever 94. The frictional wheel 100 as will be described later is caused to abut against the flat surface of the flywheel 50 by rotation of the swing lever 94 from the position as shown to the clockwise direction and is rotatably driven by the flywheel 50. Integrally formed gears 103 and 104 are journaled to a pivot 105 connected to the swing lever. The gear 103 meshes with the gear 101 whereas the gear 104 meshes with the gear 96. The gears 101, 103, 104, and 96 constitute a reduction gearing and rotation of the frictional wheel 100 is reduced to be imparted to the drum 97. The swing lever 94 is biased by a spring 106 against the position where the frictional wheel 100 is away from the flat surface of the flywheel 50. Coupled to the swing lever 94 through a spring 109 is a plunger 108 of a solenoid 107 rigidly mounted to a suitable bracket (not shown) secured to the deck 46 at under side thereof. When the solenoid 107 is energized, the plunger 108 is attractively moved to thereby swing the swing lever 94 against the bias of the spring 106 to the position where the frictional wheel 100 engages the flat surface of the flywheel 50. Accordingly, during energization of the solenoid 107, the frictional wheel 100 is rotatably driven by the flywheel 50 and rotation of the frictional wheel 100 is transmitted through the reduction gearing 101, 103, 104, and 96 to the drum 97 thereby continuing rotation of the drum 97. At this moment, the drum 97 is clockwise rotated to wind the string 98 thereto. It will be readily understood that this causes the deck 46 to be guided by the guide rods 56 and 57 and thus be lifted. When the deck 46 is lifted to the uppermost position, the movable contact 90 of the switch 89 is moved by the string 93 in a manner as mentioned hereinbefore to disconnect with the fixed contact 91. In response to this, current supply to the solenoid 107 is cut off in a manner as fully described later, and the swing lever 94 is returned by the bias of the spring 106 to the position where the frictional wheel 100 disengage the flat surface of the flywheel 50. Therefore, rotation of the drum 97 is terminated with the deck 46 being prevented thereby from moving up. Although this deck is intended to move down by the bias of the spring 60, such movement of the deck is arrested as the lever 61 engages any one of the slots 71 to 78 in the bar 70. Downward movement of the deck 46 skids the drum 77 to draw the string 98 out of the drum 97. At this time, the drum 97 is rotated at a speed that is reduced by the gearing 96, 104, 103, and 101 so that downward movement of the deck 46 is effected at relatively slow speed.

Referring back to FIG. 2, the carriage 55 is maintained by a pair of elongate guide rods 111, 112 parallel to each other, mounted to a suitable bracket (not shown) on an immovable base plate 110. The guide rods 111, 112 pass through suitable elongate guideway openings 113, 114 formed in the carriage 55. The guideway openings 113, 114 are formed to produce a skid in relative to the guide rods 111, 112. This permits the carriage 55 to slide in the direction of the arrows A, B along the guide rods 111 and 112. It will be understood that the deck 46 is vertically slidable in the cabinet 10 whereas the carriage 55 is horizontally movable in the cabinet 10. A spring motor 115 stores a coil spring (not shown) therein and has a shaft 116 firmly mounted to the base plate 110. A string 117 such as nylon thread has one end secured to the carriage 55. The spring motor 115 provides rotational force by which the string 117 is taken up and the carriage 55 is normally given a movable inclination in the direction of the arrow A. A lever 118 is pivoted to a pin 119 connected to the carriage 55. The lever 118 is normally and counterclockwise biased by a spring (not shown). In order to clockwise rotate the lever 118 against the bias of the spring (not shown), a solenoid 120 is mounted to the carriage 55. The solenoid 120 includes a plunger 121 connected to the carriage 55. The plunger 121 is attracted to thus swing the lever 118 in the clockwise direction when the solenoid 120 is energized. Upon rotation of the lever 118 by the solenoid 120, an electrical switch 122 mounted to the carriage 55 is actuated by the lever 118. The details of a control circuit for the solenoid 120 and the switch 122 will be fully described later. The lever 118 cooperates with slots 131 to 134 (131, 134 being omitted from the drawing) provided in an elongate bar 130 which is secured to the base plate 110. The positions of the slots 131 to 134 correspond to the positions of the rows of the cartridges vertically and horizontally received in the cabinet. Movement of the carriage 55 by the spring motor 115 is prevented by the lever 118 in engagement with one of the slots and the deck 46 is locked in the position with respect to one of the columns of the cartridges. Contacts 141 to 144 (141, 144 are shown in FIG. 4) are fixed to the bar 130 to correspond to the respective slots 131 to 134. A block 135 of insulator is mounted to the carriage 55 and having a common contact 140 for the contacts 141 to 144. The common contact 140 is caused to selectively contact one of the contacts 141 to 144 as the carriage 55 is moved. Operation of the switch which consists of the common contact 140 and the contacts 141 to 144 will be described later.

An elongated slide lever 136 with bent portions 137 and 138 at opposite ends thereof is slidably supported by suitable guides (not shown) connected above the base plate. The slide lever 136 is disposed in parallel with the carriage 55 and slidable as the carriage moves in the direction of the arrows A, B. The bent portion 137 is engaged by and urged by a projecting portion 139 extending from the carriage 55 at rear side thereof when the carriage 55 is critically moved in the direction of the arrow B. Thus, the slide lever 136 is moved to the position where a normally closed electrical switch 145 as will be detailed later is actuated. The bent portion 138 is engaged by and depressed by the projecting portion 139 when the carriage is critically moved in the direction of the arrow A to move the slide lever 136 to the position where the switch 145 is deactuated.

A shifting mechanism is provided to move the carriage 55 in the direction of the arrow B against rotational force of the spring motor 115 and includes a swing lever 146 pivoted to an axis 147 connected to the upper side of the deck 46. A gear 148 and a drum 149 which are coupled by a suitable coupling means or intergrally formed are journaled to the axis 147. A string 150 such as nylon thread is taken up by the drum 149 and guided by a guide pulley 151 mounted to the deck 46 and is then drawn down-wardly of the deck 46. The end of the string 150 is connected to a spring motor 152 a shaft 153 of which is supported by a suitable bracket (not shown) mounted to the base plate 110. The spring motor 152 serves to take up the loosened string 150 when the deck 46 is moved down. Rotational force of the spring motor 152 is less than that of the spring motor 115. A rubber covered frictional wheel 155 is journaled to a pivot 154 connected to the swing lever 146 and is coupled to the drum 149 by a reduction gearing 156 including the gear 148. The frictional wheel 155 as will be described later is caused to abut against the capstan 47 by rotation of the swing lever 146 from the position as shown to the clockwise direction and is rotatably driven by the capstan 47.

The swing lever 146 is biased by a spring 157 to the position where the frictional wheel 155 is away from the capstan 47. A plunger 159 for a solenoid 158 rigidly mounted to the deck 46 is coupled by a spring 160 to the swing lever 146. The plunger 159 is attractively moved, when the solenoid 158 is energized, to swing the swing lever 146 against the bias of the spring 157, to the position where the frictional wheel 155 engages the capstan 47. Accordingly, during energization of the solenoid 158, the frictional wheel 155 is rotatably driven by the capstan 47 and thus rotation of the frictional wheel 155 is imparted through the reduction gearing 156 to the drum 149 thereby continuing rotation thereof. At which time, the drum 149 is counterclockwise rotated to allow the string to be taken up by the drum. It will be understood that this take-up of the string 150 for the drum allows the carriage 55 to be guided by the guide rods 111, 112 and to be moved in the direction of the arrow B. When the carriage 55 is critically moved in the direction of the arrow B, the slide lever 136 is moved by the projecting portion 139 of the carriage 55 to the position where the normally closed switch 145 is actuated. In response to this, current supply to the solenoid 158 is broken off as in a manner described later. Thus, the swing lever 146 is returned by the bias of the spring 157 to the position where the frictional wheel 155 is away from the capstan 47. Consequently, the drum 149 is rotated to prevent movement of the carriage 55 in the direction of the arrow B. Thereafter, the carriage 55 is intended by the spring motor 115 to move in the direction of the arrow A, however, movement of the carriage is prevented by engagement of the lever 118 with any one of the slots 131 to 134.

Movement of the carriage 55 in the direction of the arrow A to engage the lever 118 with one of the slots 131 to 134 moves down the deck 46 again to allow the lever 61 to engage one of the slots 71 to 78 in the bar 70 whereby the deck 46 is selectively locked in the position where one of the cartridges 11 contained in the cabinet 10 is reproduced. FIG. 2 shows that the lever 118 engages the slot 132 in the bar 130 and the lever 61 engages the slot 76 in the ban 70 while the deck 46 is positioned forwardly of the cartridge 11 which is determined by the character B of the indicium 14 of the numeral 6 of the indicium 15. This cartridge is shown in the dot-dash line in FIG. 2.

Figure 5:
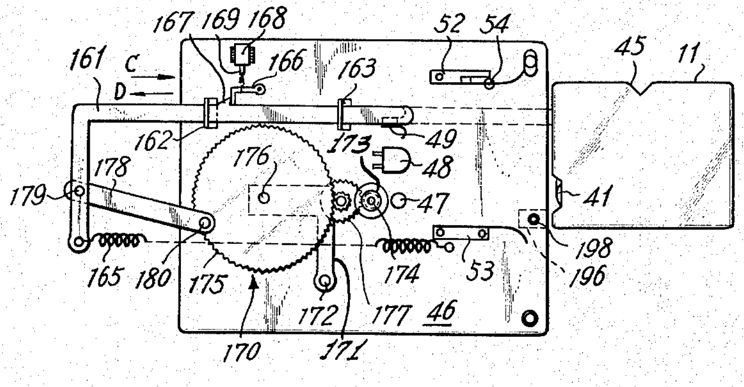
FIG. 5 is a partial top view showing the mechanism for moving the tape cartridge.
Figure 6:
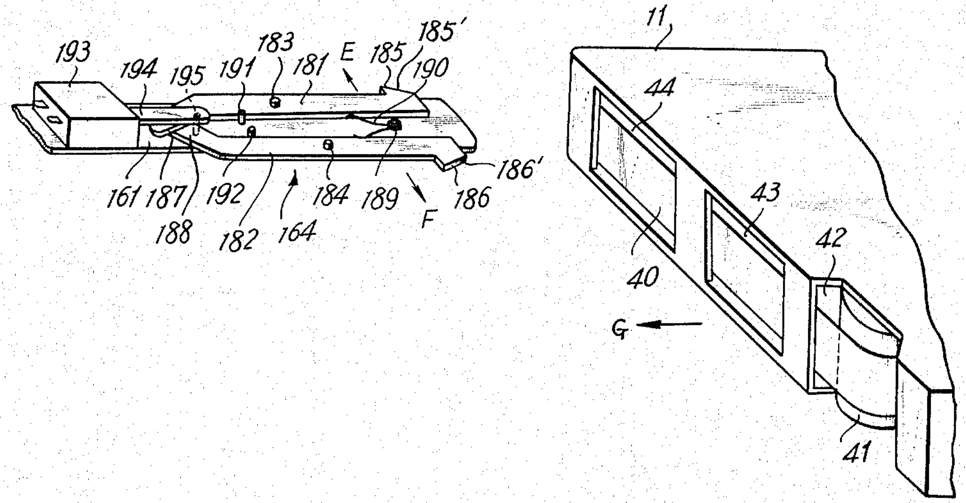
FIG. 6 is a partial perspective view showing relationship between the tape cartridge and the cartridge holding means provided in on reciprocating lever in FIG. 5.

FIGS. 5 and 6 illustrate a mechanism for moving the cartridge to be played from the initial position where it is received toward the deck 46 and positioning the cartridge in the playing position and for returning the same to the initial position. Similar numerals are used to illustrate like parts in FIG. 2. The mechanism includes a substantially L-shaped reciprocating lever 161 which is provided a holding means, indicated at 164 (FIG. 6), at one end thereof and which is slidably supported by guides 162, 163 mounted to the deck 46. The reciprocating lever 161 as will be described later is adapted to reciprocate to move the cartridge 11 from the original position to the playing position and vice versa. Although the lever 161 is intended to be biased by a tension spring 165 in the direction of the arrow C, movement of the lever 161 by the spring 165 is arrested by engagement of a hook portion formed on the lever 161 with a latch lever 166 pivoted to a pivot 167 mounted to the deck 46. The latch lever 166 is biased by a spring (not shown) in the direction for maintaining engagement with the hook portion 167. A solenoid 168 of which a plunger 169 is connected to the lever 166 is mounted to the deck 46 and is energized to move the lever 166 to disengage the hook portion 167 on the lever 161. This allows the lever 161 to move by means of the tension spring 165 in the direction of the arrow C, but movement of the lever 161 is effected in relation to operation of a shifting means as indicated at 170. The shifting means 170 comPrises a substantially T-shaped swing lever 171 pivoted to a pivot 172 mounted to the deck 46. A rubber covered frictional wheel 173 is journaled to a pivot 174 connected to the swing lever 171 at one end thereof while a gear 175 is journaled to a pivot 176 connected to the swing lever at the other end thereof. The frictional wheel 173 and the gear 175 are coupled by a reduction gearing 177. The frictional wheel 173 as will be described later is caused to abut against the capstan 47 by rotation of the swing lever 171 from the position as shown to the clockwise direction and is rotatably driven by the capstan 47. The frictional wheel 173 and the frictional wheel 155 (FIG. 2) are disposed at a different level from the deck 46 so as not to strike against each other. A link 178 has one end pivoted by a pivot 179 to the reciprocating lever 161 and the other end pivoted by a pivot 180 to the periphery of the gear 175 offset from the center thereof.

In response to energization of the solenoid 168, the latch lever 166 disengages the hook portion of the reciprocating lever 161 to slidably move the latter in the direction of the arrow C by the bias of the tension spring 165 at the same time the lever 171 is clockwise swung through the link 178 and the gear 175 to allow the frictional wheel 173 to abut against the capstan 47. Accordingly, the frictional wheel 173 is rotatably driven by the capstan 47 while the gear 176 is counterclockwise and rotatably driven. With rotation of the gear 175, the reciprocating lever 161 is gradually moved by the link 178 in the direction of the arrow C, and the gear 175 is given about a half turn to allow the tip end of the lever 161 to pass through the opening 44 and entered into the cartridge. Further rotation of the gear 175 varies movement of the reciprocating lever 161 to the direction of the arrow D through the link 178. In movement of the lever 161 in the direction of the arrow D, the cartridge 11 is held by the holding means 164 as will be described later and is moved with the lever 161. Just before the gear 175 is made a turn, the lever 161 is critically moved in the direction of the arrow D and reversely moved in the direction of the arrow C. Immediately after the lever 161 is moved in the direction of the arrow C, the hook portion 167 engages the latch lever 166 to lock the reciprocating lever 161. Even after the lever 161 has been locked the frictional wheel 173 is rotated since the one end of the link 178 is in non-operative position with respect to lock of the lever 161 to gradually weaken abutment force between the frictional wheel 173 and the capstan 47. The gear 175 is made a turn from the initial position to allow abutment force between the frictional wheel 173 and the capstan 47 to decay thereby stopping rotation of the frictional wheel 173 and the gear 175. For the purpose of illustration, a space is shown in FIG. 5 in a exaggerative manner between the capstan 47 and the frictional wheel 173, however, in practical use, the capstan 47 is close to the frictional wheel 173 to the extent that rotational force of the capstan 47 is not imparted to the frictional wheel 173.

Now, the details of the holding means 164 will be described hereinafter. The holding means 164 includes a pair of holding levers 181 and 182 each pivoted to pivots 183 and 184 connected to the reciprocating lever 161. The levers 181 and 182 are provided with pawls 185, 186 at respective one ends thereof and bent ends 187, 188 at respective other ends thereof. The levers 181 and 182 are intended to be biased by a spring 190 supported by a pin 189 mounted to the reciprocating lever 161 in the directions of the arrows E and F, respectively, but swing movement of the levers 181 and 182 by the spring 190 is limited by stopper pins 191 and 192. The bent ends 187, 188 of the levers 181, 182 interset with each other between which a pin 195 mounted to plunger 194 for a solenoid 193 is interposed. When the solenoid 193 is energized to attractively move the plunger 194, the pin 195 engages the bent ends 187, 188 and the holding levers 181, 182 are swung against the bias of the spring 190. In other words, when the solenoid 193 is energized, an interval between the pawl 185 of the lever 181 and the pawl 186 of the lever 182 is reduced. The holding levers 181 and 182 are arranged so that the interval between the pawls 185 and 186, in deenergization of the solenoid 193 is greater than the width of the opening 44 of the cartridge 11 and, in energization of the solenoid 193, is narrower than the width of the opening 44. Where the solenoid 193 is deenergized, if the reciprocating lever 161 is moved in the direction of the arrow C, slant portions 185', 186' are engaged with the edge of the opening 44 as portions of the pawls 185 and 186 are maintained inserted in the opening 44 of the cartridge 11. Further movement of the lever 161 in the direction of the arrow C causes the holding levers 181, 182 to swing by the edge of the opening 44 against the bias of the spring 190 to completely enter the pawls 185, 186 into the opening 44. Accordingly, the lever 161 is moved in the direction of the arrow D, and thus the cartridge 11 is moved in the direction of the arrow the original position with being held by the holding levers 181, 182. The cartridge 11, which held by the holding means 164, is moved in the direction of the arrow G is moved to the deck 46 with being guided by the cartridge guides 52, 53. And, the cartridge 11 is positioned in the playing position as the retention roller 54 in the cartridge guide 52 enters into the notch 45 in the cartridge side at the point where the reciprocating lever 161 is critically moved in the direction of the arrow D. The cartridge 11 positioned in the playing position is reproduced as the pinch roller 41 abuts against the capstan 47 over the tape 40 and the tape 40 is drivingly transported with being slidably in contact with the magnetic head 48. Where the solenoid 168 is energized and the latch lever 166 is disengaged from the reciprocating lever 161, if the lever 161 is moved as mentioned in the direction of the arrow C, the end of the lever 161 contacts with a contact portion (not shown) which is provided in the cartridge 11 opposite to the opening 44 to move back the cartridge 11 from the playing position. When the cartridge 11 is returned to the original position, the reciprocating lever 161 is reversed to move in the direction of the arrow D. However, it is noted that the reciprocating lever 161 is independently moved in the direction of the arrow D when the solenoid 193 is energized since the interval between the pawl 185 of the holding lever 181 and the pawl 186 of the holding lever 182 is reduced so that the pawls 185, 186 do not engage the leading edge of the cartridge. In FIG. 5, numeral 196 indicates an electrical switch which is firmly mounted to the deck 46 at the lower side thereof and of which an actuator 198 passes through a hole bored through the deck 46 and projects upwardly of the deck 46. The switch 196 when the cartridge 11 is moved to the deck 46 is such that the actuator 198 is actuated by the cartridge. The switch 196 includes two switch members **196*a*, 196b shown in FIG. 4. The switch members 196*a*, 196*b* are adapted to open when the actuator 198 is actuated by the cartridge 11** and to close when the actuator is deactuated.

FIG. 4 shows a control circuit for each of the solenoids shown in FIGS. 2, 3, 5, and 6, and the operation of the whole tape player will be apparent from the detailed description of the control circuit as in the following:

Similar numerals are used to illustrate like switches and solenoids in FIGS. 2, 3, 5, and 6. The common contact 80 which is selectively engageable with the contacts 81 to 88 by upward and downward movement of the deck 46 is connected to a lead 200 connected to a power source 199. Each of the contacts 81 to 88, as shown, is connected through the selecting switches 31 to 38 to a lead 201. The selecting switches 31 to 38 are so called "alternatively selecting switches" such that one of the switches is opened and remainders are closed when the push button 30 (FIG. 1) corresponding to the switch to be opened is depressed, and FIG. 4 illustrates that the push button 30 bearing numeral 6 thereon is depressed and then the switch 36 is opened. The solenoid 63 has a coil one side of which is connected by a lead 202 to the power source 199 and the other side of which is connected by way of a lead 203, the switch member 196a of the switch 196, the lead 201, the selecting switches 31 to 38, the contacts 81 to 88 and the common contact 80 to the lead 200. The solenoid 107 has a coil one side of which is connected by the switch 89 to the lead 200 and the other side of which is connected to the lead 203. The solenoids 168 and 193 each has a coil one side of which is connected to the lead 202 and the other side of which is connected to one side of a coil of the solenoid 193 and to a connecting point 204. Another side of a coil of the solenoid 193 is connected through a parallel connection of a condensor 205 with a resistor 206 to the lead 201. The resistor 206 is provided to discharge the condensor 205 and has a high resistance. The connecting point 204 is connected through a parallel connection of a condensor 207 with a resistor 208, the switch 66, and the switch 118 to the lead 200. The resistor 208 is provided to discharge the condensor 207 and has a high resistance. Connected to a lead 210 connected to a power source 209 is the common contact 140 which is selectively engageable with the contacts 141 to 144 by slidable movement of the carriage 55 in the directions of the arrows A, B. Each of the contacts 141 to 144, as shown, is connected through the selecting switches 21 to 24 to a lead 211. The selecting switches 21 to 24 are so called "alternatively selecting switches" such that one of the switches is opened and remainders are closed when the push button 20 (FIG. 1) corresponding to the switch to be opened is depressed, and FIG. 4 shows that the push button 20 bearing the character B thereon is depressed and then the switch 22 is opened. The solenoid 209 has a coil one side of which is connected to the power source 209 and other side of which is connected by way of a lead 211, the switch member 196b of the switch 196, the lead 201, the selecting switches 21 to 24, the contacts 141 to 144, and the common contact 140 to the lead 210. The solenoid 158 has a coil one side of which is connected by the switch 145 to the lead 210 and other side of which is connected to the lead 211.

It will be understood that where the deck 46 is in the position at which the cartridge (A, 2) determined by the numeral 2 of the indicium 15 and the character A of the indicium 14 is to be played, the common contacts 80 and 140 are in the position indicated by the dotted line of FIG. 4. It is noted that at this moment the selecting switches 32 and 21 are opened. In order to play the cartridge (B, 6) determined by the character B of the indicium 14 and the numeral 6 of the indicium 15 in substitution for the cartridge (A, 2), the push buttons 20, 30 for the selecting switches 36 and 22 corresponding to the cartridge (B, 6) are depressedly operated. Operation of the push buttons 20, 30 for the switches 36 and 22 will open the latter while closing the switches 32 and 21. Closing of the selecting switch 32 will constitute a closed circuit which comprises the solenoids 168 and 193, a parallel connection of the condensor 205 with the resistor 206, the lead 201, the selecting switch 32, the contact 82, the common contact 80, the lead 200, the power source 199, and the lead 202 at the same time the solenoids 168 and 193 are energized in pulse fashion by the power source 199. In response to energization of the solenoid 168, the reciprocating lever 161 is disengaged from the latching lever 166 in pulse fashion to initiate reciprocal movement of the reciprocating lever in the directions of the arrows C, D. On the other hand, in response to energization of the solenoid 193, the holding levers 181 and 182 are swung against the bias of the spring 190. After the solenoid 193 has been energized in pulse fashion by a delay circuit 212, they are maintained in operative condition for the period in which the reciprocating lever 161 is reciprocally moved. The delay circuit 212 includes, for instance, a start switch (not shown) actuated by the plunger 194 which is moved when the solenoid 193 is energized, a transistor, a condensor resistor and the like. During one reciprocal movement of the reciprocating lever 161, the cartridge (A, 2) is returned from the playing position to the original position. In response to restoration of the cartridge (A, 2) to the initial position, the switch 196 which has been actuated by the cartridge (A, 2) is not operated so that the switch members 196a and 196b are closed. By closing the switch member 196*a*, a closed circuit is constituted which includes the lead 202, the solenoid 63, the lead 203, the switch member 196a, the lead 201, the selecting switch 32, the contact 82, the common contact 80, the lead 200, and the power source 199, and the solenoid 63 is energized. On the other hand, by closing of the switch member 196*b*, a closed circuit is provided which includes the solenoid 120, the lead 211, the switch member 196*b*, the lead 201, the selecting switch 141, the common contact 140, the lead 210, and the power source 209, and the solenoid 120 is energized by the power source 209. In response to energization of the solenoid 63, the deck 46 is released from the lever 61 and is thus moved downwardly. During downward movement of the deck 46, the common contact 80 comes in contact with the contacts 83, 84, and 85 one by one for which time the selecting switches 33, 34, and 35 have been closed so that the solenoid 63 continues its energization. When the deck 46 is moved down to the position where the common contact 80 contacts with the contact 86, the selecting switch 36 is opened so that the solenoid 63 is deenergized and the lever 61 is returned so as to engage the slot 76 in the bar 70 to lock the deck 46. On the other hand, in response to energization of the solenoid 120, the carriage 55 is disengaged from the lever 118 and is moved in the direction of the arrow A. When the carriage 55 is moved in the direction of the arrow A and the common contact 140 comes in contact with the contact 142, the selecting switch 22 is deenergized and the lever 118 is returned so as to engage the slot 132 in the bar 130 to lock the carriage 53. This is illustrated in FIG. 2, in which the deck 46 is in the position where the cartridge (B, 6) is to be played. By reciprocal movement of the levers 61 and 118, the normally closed switches 66 and 122 are once opened and again closed. Accordingly, after the deck 46 has been positioned in the position where the cartridge (B, 6) is to be played, the solenoid 168 is energized through the condensor 207 by the power source 199 in pulse fashion. In response to energization of the solenoid 168 in pulse manner, the reciprocating lever 161 is reciprocally moved in the directions of the arrows C, D. Reciprocal movement of the lever 161 allows the cartridge (B, 6) to move from the original position, as mentioned, to the playing position for the play of the cartridge. From the fore-going description, it will be understood that the automatically indexed or designated cartridge is played by suitably selecting and operating the selecting push buttons 20 and 30.

When the deck 46 is critically moved downwardly, the switch 89 is closed and the solenoid 107 is energized by the power source 199 whereby the deck 46 is automatically moved to the upper most position. Meanwhile, when the carriage 55 is critically moved in the direction of the arrow A, the switch 145 is closed to energize the solenoid 158 by means of the power source thus automatically and critically moving the carriage 55 in the direction of the arrow B, as previously mentioned. It will be understood that upward movement of the deck 46 and movement of the carriage 55 in the direction of the arrow B are not effected when the cartridge is held in the playing position, namely, the switch 196 is actuated and the switch members are opened.

Although the invention has been described with reference to specific means for practicing the invention, it is apparent that many modification may be made by one skilled in the art, and accordinGly, it is intended that the scope of the invention be limited only as defined in the following claims.

What is claimed is:

1. A tape player for playing a plurality of magnetic tape cartridges each having a tape therein comprising: compartment means for vertically and horizontally storing a plurality of tape cartridges in a plurality of stacks; a deck carrying tape driving means including a capstan for drivingly transporting a tape within a cartridge, and at least one magnetic head adapted to transduce the tape; deck shifting means for moving the deck to a position adjacent each of the cartridges in said compartment means, said deck shifting means having a horizontal shifting mechanism for horizontally moving the deck and a vertical shifting mechanism for vertically moving the deck; selecting means for indexing a cartridge to be played from out of the cartridges in said compartment means; control means for controlling the operation of said deck shifting means in cooperation with said selecting means so as to move said deck to a first position adjacent to the selected cartridge indexed by said selecting means; cartridge transfer means for moving the selected cartridge, after the deck has been moved to the first position adjacent to the selected cartridge, from an original position where said cartridge is in said stack to a playing position on the deck where said cartridge is played by the magnetic head and said tape driving means, said cartridge transfer means including a reciprocating lever with holding means for holding the leading edge of the cartridge, lever driving means for reciprocally driving said reciprocating lever between a first lever position wherein said reciprocating lever engages a cartridge in said original position and a second lever position wherein said selected cartridge while engaged by said holding means is in said playing position, and means for controlling the operation of said lever driving means, said cartridge transfer means being operable to return a cartridge in said playing position to said original position in response to another cartridge being indexed by said selecting means.

2. A tape player for playing a plurality of magnetic tape cartridges in accordance with claim 1, wherein said lever driving means for driving said reciprocating lever comprises a spring member urging said reciprocating lever in one direction, a swingable lever on said deck, a rotatable frictional wheel carried by said swing lever, a rotary member rotatably mounted on said swing lever and operable to be rotated by said frictional wheel, and a link member connected at one end to a point on said rotary member spaced from the center of rotation thereof and at the other end to said reciprocating lever, said frictional wheel being biased by the bias of said spring member to a position where said frictional wheel abuts against said capstan, said frictional wheel being operable to be rotatably driven by the rotational force of said capstan, rotation of said frictional wheel being imparted to said rotary member to rotate the latter so that said reciprocating lever is reciprocally moved through said link member.

3. A tape player for playing a plurality of tape cartridges in accordance with claim 2, wherein said control means for said lever driving means in said cartridge transfer means comprises a latching lever for locking said reciprocating lever in the second lever position corresponding to said playing position, a solenoid having a plunger coupled to said latching lever and a power control circuit for energizing said solenoid in pulse fashion energizeable in response to the time when the selected cartridge to be played is indexed and when said deck is moved by said deck shifting means to the position corresponding to the selected cartridge.

4. A tape player for playing a plurality of magnetic tape cartridges in accordance with claim 1, wherein said holding means comprises a pair of holding levers swingably provided spaced away from each other on said reciprocating lever and having at their front ends a pawl portion and at their rear ends a bent portion, a spring member for biasing said holding levers in the direction in which said pawl portions are opened opposite to each other, a solenoid having a plunger coupled to each bent portion of said holding levers and mounted on said reciprocating lever for moving said holding levers against the bias of said spring member, and a powercontrol circuit for energizing said solenoid during one reciprocal movement of said reciprocating lever by which the cartridge in said playing position is returned to said original position, said pawl portions of said holding levers having an engagement relation with an opening formed in the leading edge of said cartridge when said solenoid is deenergized while said pawl portions having a free relation with said opening when said solenoid is energized.

5. A tape player for playing a plurality of magnetic tape cartridges in accordance with claim 1, including a carriage, a pair of vertical guide rods parallel to and vertically spaced away from each other and mounted on said carriage, said deck being slidably mounted on said pair of vertical guide rods, a pair of horizontal guide rods parallel to and laterally spaced away from each other, said carriage being slidably mounted on said horizontal guide rods, said horizontal shifting mechanism for said deck shifting means being coupled to said carriage while said vertical shifting mechanism for said deck shifting means being couPled to said deck.

6. A tape player for playing a plurality of magnetic tape cartridges in accordance with claim 5, wherein said vertical shifting mechanism includes a spring downwardly biasing said deck, a drum member on said deck and operable to be selectively rotatably driven by said tape driving means, and a string member having one end secured with respect to one of the vertical guide rods above the deck and wound at the other end to said drum member, said deck being upwardly shifted by said string member being wound when said drum member is rotated.

7. A tape player for playing a plurality of magnetic tape cartridges in accordance with claim 5, wherein said horizontal shifting mechanism includes bias means biasing said carriage in one direction, a drum member on said deck and operable to be selectively rotatably driven by said tape driving means, and a string connected at one end to said drum member and at the other end to a fixed portion of said player, said carriage being moved in the direction reversed to said one direction by said string member being wound to said drum member with rotation of said drum member.

8. A tape player for playing a plurality of magnetic tape cartridges in accordance with claim 5, wherein said control means includes a vertical bar member adjacent said deck, a plurality of slots in said vertical bar member corresponding in number to those of said cartridges vertically arranged, a first stop lever on said deck operable to selectively engage each of said slots in said vertical bar member, a first solenoid firmly mounted to said deck and having a plunger coupled to said first stop lever, a power control circuit for energizing said first solenoid for the period when said lever with said deck is moved to the position where said first stop lever engages a slot in said vertical bar member corresponding to the cartridge designated by said selecting means, a horizontal bar member immovably provided parallel and adjacent to said carriage, a plurality of slots in said horizontal bar member corresponding in number to those of said cartridges horizontally arranged, a second stop lever mounted on said carriage operable to selectively engage each of said slots in said horizontal bar, a second solenoid secured to said carriage and having a plunger coupled to said second stop lever, and a power control circuit for energizing said second solenoid for the period when said second stop lever is moved along with the carriage to the position where said second stop lever engages said slot in said horizontal bar corresponding to the cartridge designated by said selecting means.

* * * * *